United States Patent [19]

Oyamada et al.

[11] Patent Number: 5,452,443
[45] Date of Patent: Sep. 19, 1995

[54] MULTI-PROCESSOR SYSTEM WITH FAULT DETECTION

[75] Inventors: Hideo Oyamada; Minoru Shiga, both of Kanagawa, Japan

[73] Assignee: Mitsubishi Denki Kabushiki Kaisha, Tokyo, Japan

[21] Appl. No.: 152,875

[22] Filed: Nov. 15, 1993

Related U.S. Application Data

[63] Continuation of Ser. No. 899,752, Jun. 17, 1992, abandoned.

[30] Foreign Application Priority Data

Oct. 14, 1991 [JP] Japan .................... 3-264718

[51] Int. Cl.⁶ ..................... G06F 13/00; G06F 11/00
[52] U.S. Cl. ................ 395/182.08; 395/183.07; 395/183.19; 395/200.14
[58] Field of Search ............. 395/575; 371/68.3, 67.1, 371/68.1, 9.1, 11.3, 12, 16.1

[56] References Cited

U.S. PATENT DOCUMENTS

| | | | |
|---|---|---|---|
| 4,251,873 | 2/1981 | Joby | 371/68.3 X |
| 4,621,318 | 11/1986 | Maeda | 364/200 |
| 4,730,319 | 3/1988 | David | 371/68.3 X |
| 4,984,190 | 1/1991 | Katori et al. | 364/900 |
| 5,132,971 | 7/1992 | Oguma | 371/68.3 X |
| 5,136,704 | 8/1992 | Danielsen et al. | 371/68.3 |
| 5,157,781 | 10/1992 | Harwood et al. | 395/575 |

FOREIGN PATENT DOCUMENTS

| | | | |
|---|---|---|---|
| 55-72262 | 5/1980 | Japan | 371/68.3 |
| 8502698 | 6/1985 | WIPO | 371/68.3 |

OTHER PUBLICATIONS

Stanley Chao, "The System Organization of Mobidic B", 1959 Proceedings of the Eastern Joint Computer Conference, pp. 101-107.

*Primary Examiner*—Hoa T. Nguyen
*Attorney, Agent, or Firm*—Wolf, Greenfield & Sacks

[57] ABSTRACT

A bus coupling type multi-processor system is disclosed having multiple processor modules and a fault detection system. A processor module includes a first processor, a second processor, and a monitor including a timer for measuring elapsed time, a register for storing a flag indicating the operation of its own processor, and a detector for detecting a fault either in its own processor or in another processor module. A starting circuit starts the second processor one clock period later than the first processor. A comparator compares the output from the first processor with the output of the second processor to detect a fault. A flag is set by its own processor module and is reset by a signal from another processor module. When a flag set by a first processor module is not reset by a second processor module, the monitor circuit in the first processor module detects this and judges that a fault has occurred in the second processor module. When a flag in a first processor module is not set within a predetermined time, the monitor circuit in a second processor module detects this and judges that a fault has occurred in the first processor module.

12 Claims, 9 Drawing Sheets

MULTI-PROCESSOR SYSTEM WITH FAULT DETECTION

This application is a continuation of application Ser. No. 07/899,752, filed Jun. 17, 1992, now abandoned.

BACKGROUND OF THE INVENTION

The invention relates to an information processing apparatus in which high reliability is required for a processor.

Figure 7:
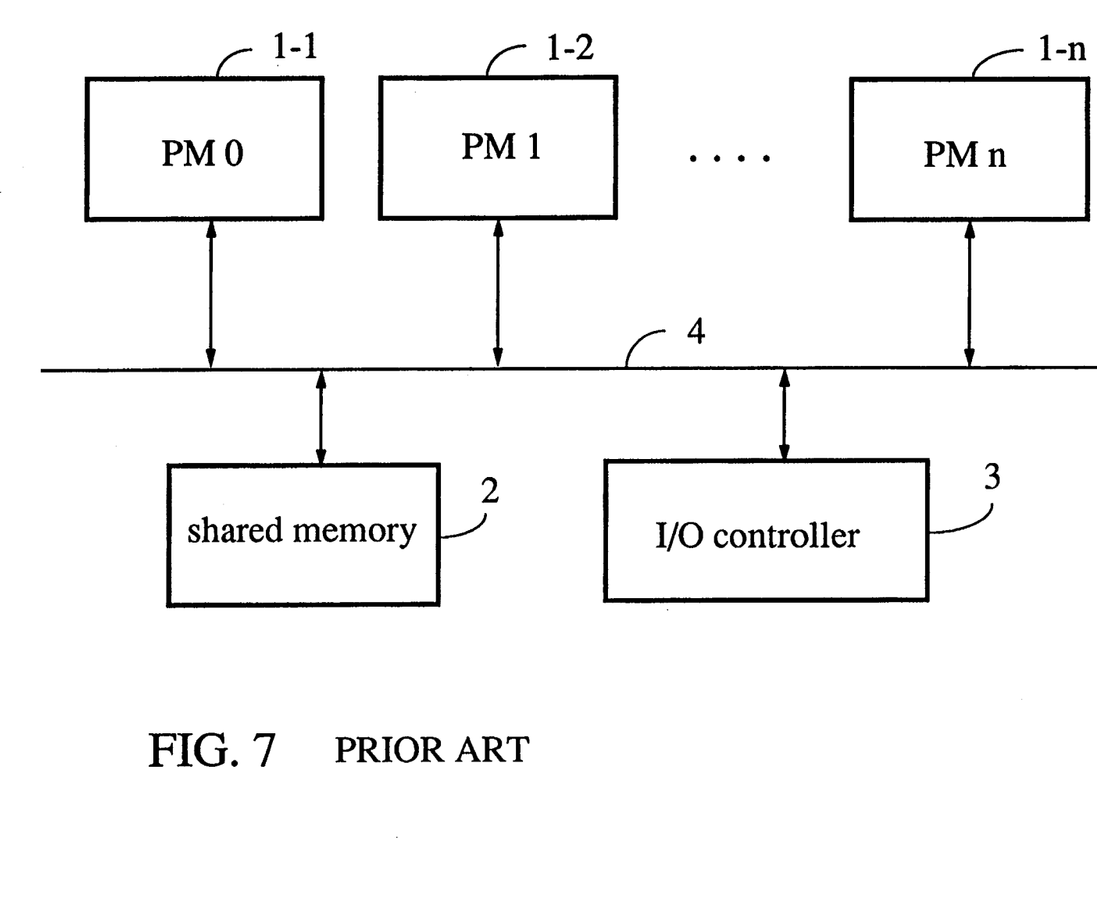
FIG. 7 is a general block diagram of the conventional information processing apparatus.

FIG. 7 is a general bus coupling type multi-processor. In the figure, 1-1, 1-2 and 1-n are processor modules. 2 is a shared memory. 3 is an I/O controller. 4 is a system bus for coupling these devices. The processor module 1-n generally uses the shared memory 2 and the I/O controller 3 via the system bus 4. Therefore if a fault occurs in any processor module 1-n, then the shared memory 2 is inoperative and also the system is apt to break down. Accordingly it is necessary to detect faults of the processor module.

Figure 8:
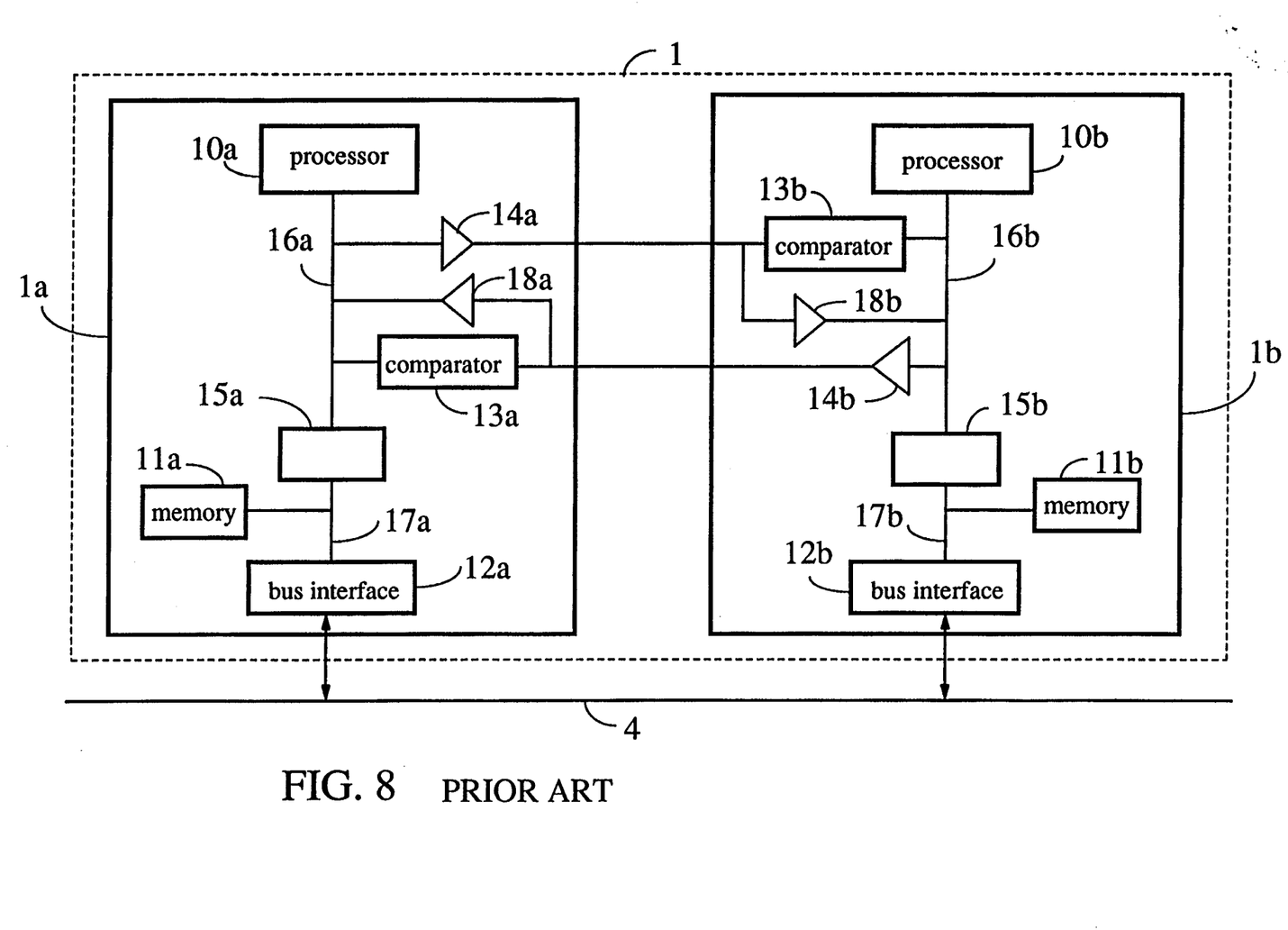
FIG. 8 is a block diagram of a part of the conventional information processing apparatus.

FIG. 8 is a block diagram of the processor module in the conventional information processing apparatus disclosed in the U.S. Pat. No. 4,541,094. In the figure, processor module 1 is comprised of the boards 1a and 1b of the same construction. In the boards 1a and 1b, 10a and 10b are processors which operate in the same way. 11a and 11b are memories for storing the data. 12a and 12b are bus interfaces which transfer the data between internal buses 17a, 17b and the system bus 4. 13a and 13b are comparators which detect and compare the signals of the internal buses 17a and 17b. 14a and 14b are buffers which connect the processor buses 16a, 16b with the comparator 13b, 13a, respectively. 15a and 15b are buffers which connect the processor buses 16a, 16b with the internal buses 17a, 17b, respectively. 18a and 18b are buffers which connect the outputs of the processor buses 16a, 16b and the buffers 14b, 14a, respectively. Memories 11a and 11b are half memories which logically consist of one memory by the two.

The operation of the information processor of FIG. 8 is explained here. When the processors 10a and 10b read out the data from the memories 11a and 11b, respectively, the processors 10a and 10b send the address data to the processor buses 16a and 16b, respectively. The memories 11a and 11b and comparators 13a and 13b receive this data and the comparators 13a and 13b compare the address data with other address data received from the other boards via the buffers 14b and 14a, respectively. When the address sent from the processors 10a and 10b indicates the memory 11a side, the memory 11a sends the data to the processor 10a via the buffer 15a and also sends the data to the processor 10b via the buffers 14a and 18b. When the address sent from the processors 10a and 10b indicates the memory 11b side, the memory 11b sends the data to the processor 10a via the buffer 14b and 18a and also sends the data to the processor 10b via the buffers 15b. When the processors 10a and 10b write the data into the memories 11a and 11b, the address data are sent in the same way as that of reading the data. When the data sent from the processors 10a and 10b indicates memory 11a side, the processors 10a and 10b send the data to the processor buses 16a and 16b, respectively. The memory 11a receives the data via the buffer 15a, and the comparator 13a compares the data received via the buffers 14a with the data received from the processor 10a, and the comparator 13b compares the data received via the buffers 14b with the data received from the processor 10b, and they detect errors. When the data accessed from the processors 10a and 10b are not in the memories 11a and 11b, the addresses and the data are sent to the shared memory 2 via the system bus 4. The shared memory 2 sends the data to the processors 10a, 10b and the memories 11a and 11b. The comparators 13a and 13b compare the addresses and the data sent from the processors 10a, 10b, the memories 11a, 11b and the shared memory 2 and detect errors.

Figure 9:
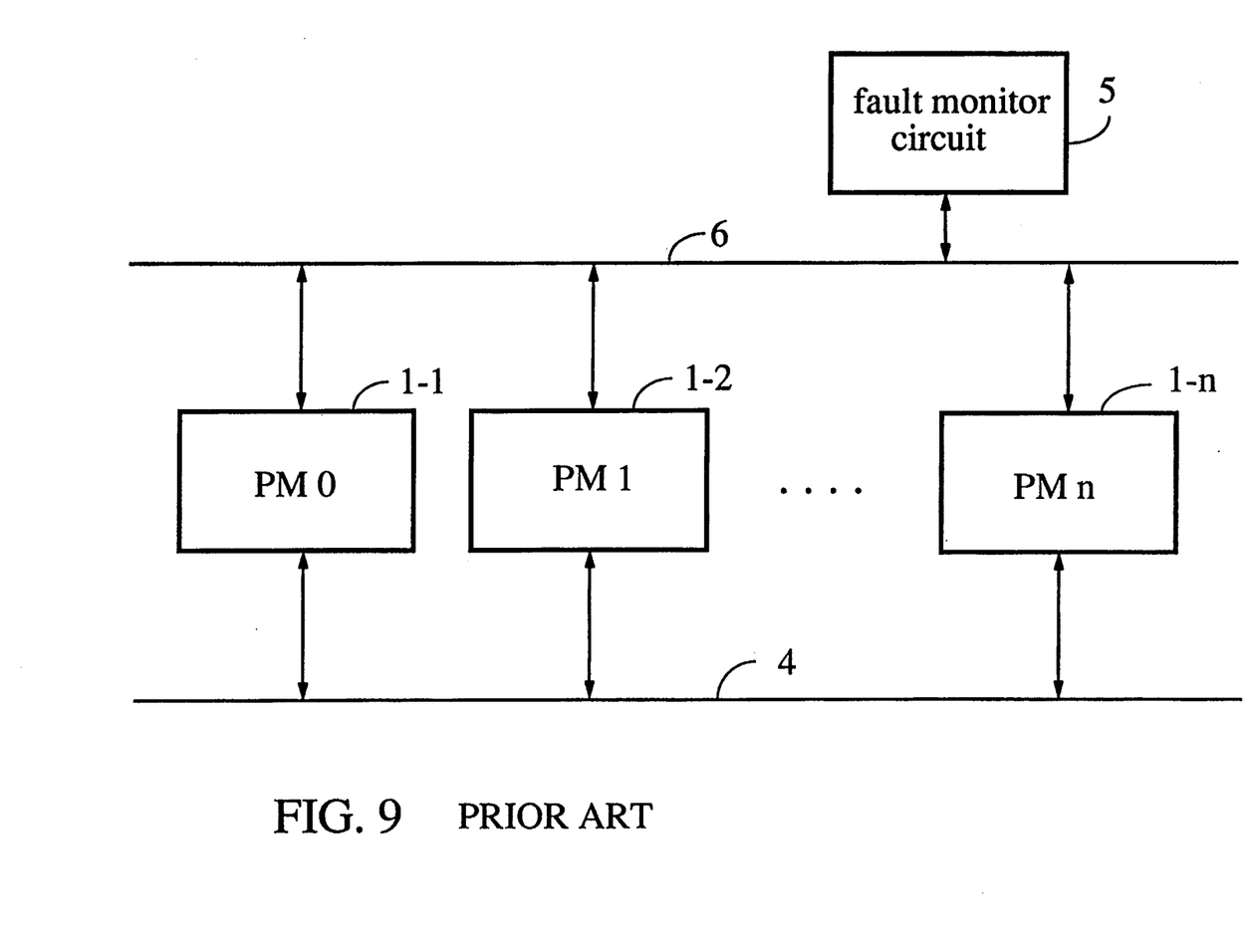
FIG. 9 is other block diagram of a conventional information processing apparatus.

FIG. 9 is a block diagram of a conventional information processing apparatus disclosed in the Japanese patent publication No. 59-4054. In the figure, numerals 1-1 to 1-n and 3 to 4 are the same as those in FIG. 7. 5 is a fault monitor circuit for monitoring all processor modules. 6 is a private line by which the processor module 1 communicates with the fault monitor circuit 5. The fault monitor circuit 5 comprises a monitoring counter. Each processor module reads out periodically the fault monitor circuit 5 and steps up the content of the counter. Another processor module reads out the result of the fault monitor circuit 5 at a longer period than the above count up period. If the read out value is equal to the previous read out value, it is judged that there occurred a fault in the corresponding processor module.

As described above, in the conventional information processor, since the processors compared are mounted on the separate board, the delay time increases by providing many buffers between the processors and the comparators, respectively, and by the longer distances between the boards. Since it is very difficult to shorten the clock period for the above reason, a problem arises that the high operating frequency and high speed operation can not be obtained. Also since the comparators and the bus interfaces are duplicated, there arises another problem that the hardware becomes very large.

In the other conventional information processing apparatus shown in FIG. 9, the fault monitor circuit must be supplied in the center of the system. In this case, since the traffic used for detecting the fault occurs for every processor module, there arises another problem that the private line must be provided in the system.

It is an object of the present invention to provide an information processing apparatus for detecting errors of the high speed processors by using less hardware.

It is another object of the present invention to provide an information processing apparatus for detecting faults of the other processors by using a few bus loads.

SUMMARY OF THE INVENTION

The information processing apparatus of the present invention comprises a starting circuit for operating the second processor after one clock period from the first processor, and a comparator with a buffer for comparing the output of the first processor with the second processor delayed by one clock period, and detects an error between them, in order to avoid the influence of the buffer for connecting two processors and the line delay. The information processing apparatus comprising, (a) a first processor operating at a predetermined sequence, (b) a second processor operating with delay in the same manner as the first processor, (c) a comparator for comparing the outputs of the first and second processors and detecting an error.

The information processing apparatus of the invention comprises a monitor circuit in each processor module, each monitor circuit including a timer for measuring a lapsed time, a register for holding a flag indicating the operation of its own processor and a detector for detecting the fault of its own processor or another processor module. The register is reset by the read out from another processor module and is set by the writing from its own processor module.

In the information processing apparatus of the present invention, when the flag being set by the first processor module is reset by the second processor module, the second processor is considered to be operating normally. But, when the flag being set by the first processor module is not reset by the second processor module, the first processor module judges that a fault has occurred in the second processor module.

The information processing apparatus of the present invention comprises (a) a first processor module including a monitor circuit having a register which stores a flag being set for every predetermined period, for detecting the non-reset flag in order to detect the fault of the second processor; and (b) a second processor module including a monitor circuit for resetting the flag of the first processor module.

In the information processing apparatus of the invention, the second processor module monitors the first processor module so that the flag, which is set by the first processor module and is reset by the second processor module, is not set again by the first processor module.

The information processing apparatus of the present invention comprises (a) a first processor module including a register for storing a flag which is set for every predetermined unit period; and (b) a second processor module including a monitor circuit for reading out a flag of the first processor module at a predetermined period longer than the unit period, and detecting a fault of the first processor module.

In the information processing apparatus of the present invention, the first processor operates as a processor, and the second processor operates as an error detector. The comparator with its buffer delays the output of the first processor and compares it with the output of the second processor. The first processor executes the next procedure immediately after sending its output to the comparator with the buffer without waiting for the result of comparison.

In the information processing apparatus of the present invention, the timer of the first processor module measures the time. When the timer detects the period T, it generates an interruption signal into the processor and tries to set a flag in response to the instruction from the processor. In the information processing apparatus of the present invention, the monitor circuit of the second processor module resets the flag within the period T. If the detector in the monitor circuit of the first processor module detects the flag to be the operation state ( set state ), the first processor module judges that there occurred a fault in the second processor module, for example, the processor module having the right to read a flag in all processor modules.

In the information processing apparatus of the present invention, when the timer in the monitor circuit of the second processor module detects the period to be larger than the period T, the detector in the monitor circuit reads the flags of the registers in all processor modules and judges that there occurred a fault in the first processor module in which the flag had not indicated an operation state (set state).

DETAILED DESCRIPTION OF THE PREFERRED EMBODIMENTS

First embodiment

Figure 1:
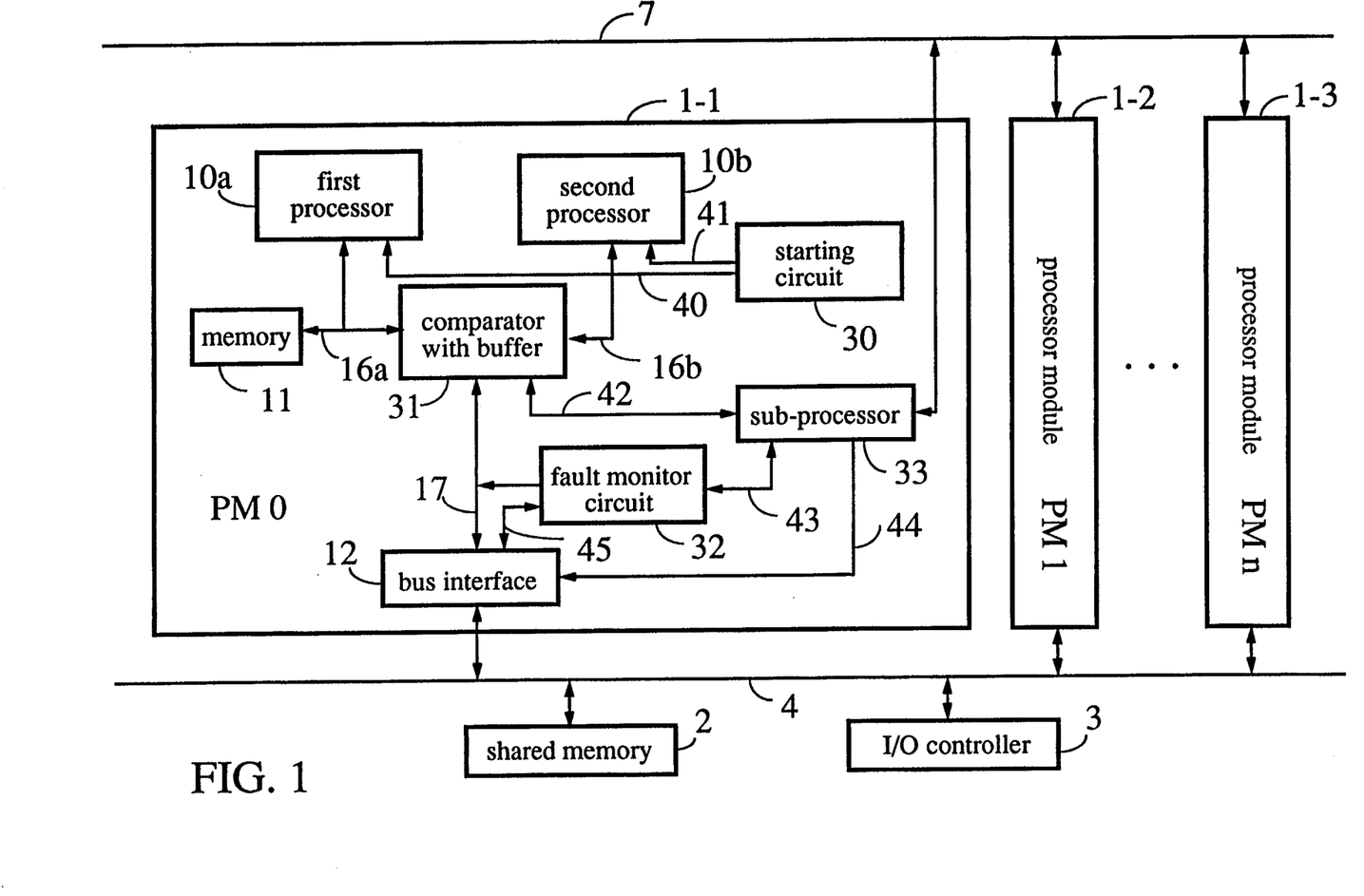
FIG. 1 is a block diagram of a first embodiment of the information processing apparatus of the present invention.

FIG. 1 is a block diagram of a bus coupling type multi-processor of the present invention. In the figure, numerals 1-1 to 1-n, 2 to 4, 10 to 12 and 17 are the same as those of the conventional information processor. 7 is a serial bus for communicating the fault information and etc. In the processor module 1, 30 is a starting circuit for controlling the delay between the processors 10a and 10b. 31 is a comparator with buffer. 32 is a fault monitor circuit for monitoring the operation of its own or another processor module. 33 is a sub-processor for controlling the state of its own processor module.

The operation of the present invention is described here. The starting circuit 30 produces the reset signal 41 delayed by one clock period after the reset signal 40 when the power is turned ON so that the second processor 10b may operate after the processor 10a. Therefore the second processor 10b starts late by one clock period from the first processor 10a. The first processor 10a accesses to the memory 11 directly and sends the output of the processor 10a to the comparator with buffer 31. The second processor 10b is the same construction as the first processor and detects the error of the first processor 10a. The second processor 10b constantly sends the address signal and the control signal to the comparator with buffer 31 and also the data is sent to the comparator with buffer 31 when the data is written. On the other hand, when the first processor 10a reads out the data from the memory 11, the comparator with buffer 31 receives the data and sends it to the second processor 10b after one clock period. As described above, the second processor always operates after one clock period from the first processor 10a. The comparator with buffer 31 outputs an error detection signal 42 when the outputs of the first processor 10a and the second processor 10b mismatch.

The fault monitor circuit 32 monitors the operation of another processor module and the I/O controller using bus status signal 45 via bus interface 12 and outputs a hull detection signal 43 when the operation is not finished before the predetermined period. When the sub-processor 33 receives the error detection signal 42 and the fault detection signal 43, it outputs the bus interface inhibit signal 44 and stops the operation of the bus interface 12 in order to prevent the fault from spreading out, and also informs the occurrence of the fault to another processor module via serial bus 7.

Therefore, the errors of the processors are known from the detection error produced by comparing the outputs of the first and second processors, and the fault of all processor modules is known by mutually monitoring the operation time between the processors.

Figure 2:
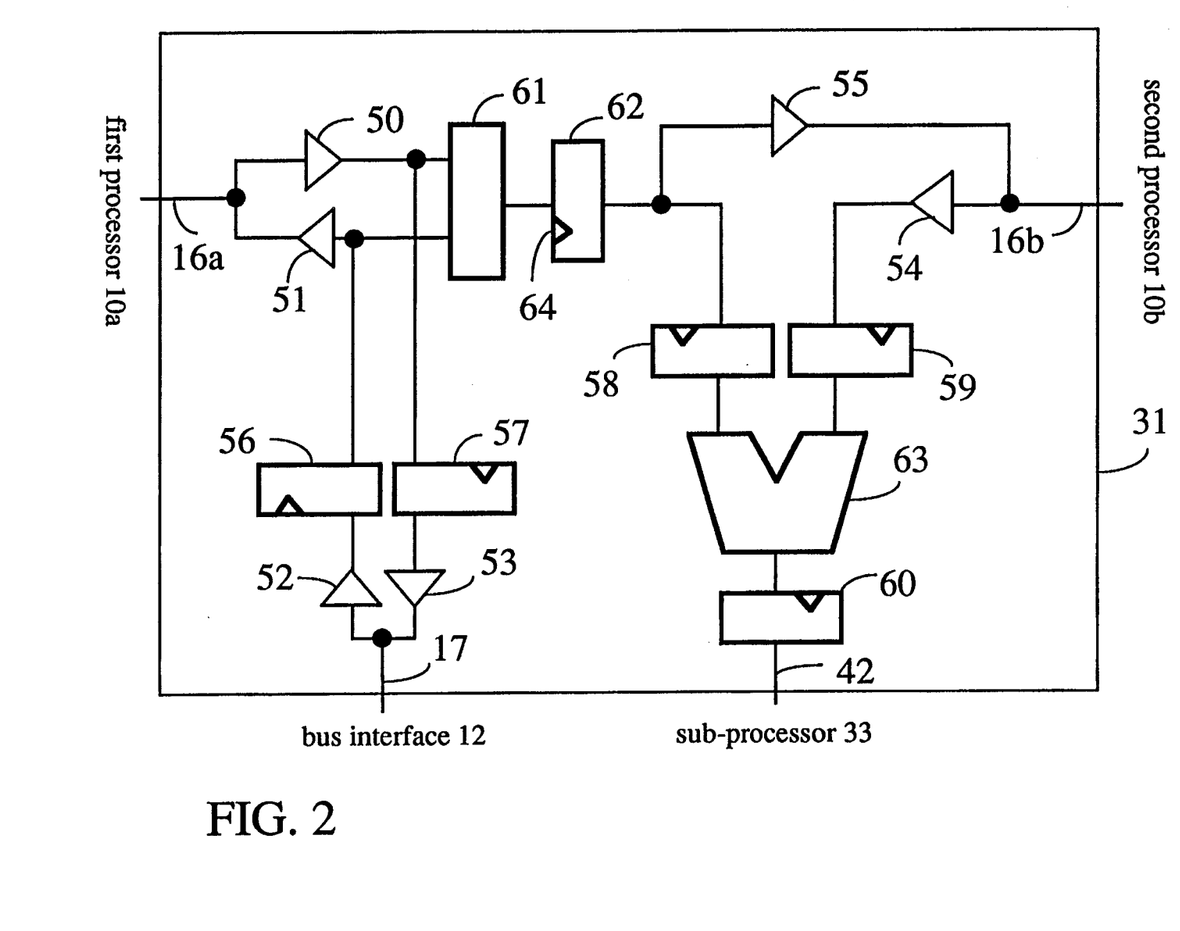
FIG. 2 is a detailed block diagram of a comparator with a buffer of the first embodiment.

FIG. 2 is a detailed block diagram of a comparator with buffer 31 in FIG. 1. The address signal and the control signal are similar with those of FIG. 1, and thus the detailed description is omitted. In FIG. 2, 51 is a driver for driving the first processor 10a and the memory 11. 53 is a driver for driving the bus interface 12. 55 is a driver for driving the second processor 10b. 50, 52 and 54 are receivers for receiving the backward outer signals corresponding to the driver 51, 53 and 55, respectively. 56 is a buffer register for synchronizing the data from the bus interface 12 with the clock signal. 57 is a buffer register for synchronizing the data from the memory 11 with the clock signal. 58 and 59 are buffer registers for synchronizing the data from the first processor 10a and the second processor 10b before the data input into the comparator. 60 is a flip-flop for synchronizing the control signal with the sub-processor when the control signal is sent from the comparator to the sub-processor. 61 is a selector for selecting data from receiver 50 and the buffer register 56. 62 is a buffer register for delaying input data received from the selector 61 by one clock period. 63 is a comparator for comparing the outputs of the buffer registers 58 and 59. 64 is a clock signal. The signal line is not illustrated in the figure, but the same clock or the same phase clock signal is applied to the buffer registers 56~59, 62 and flip-flop 60.

Figure 3:
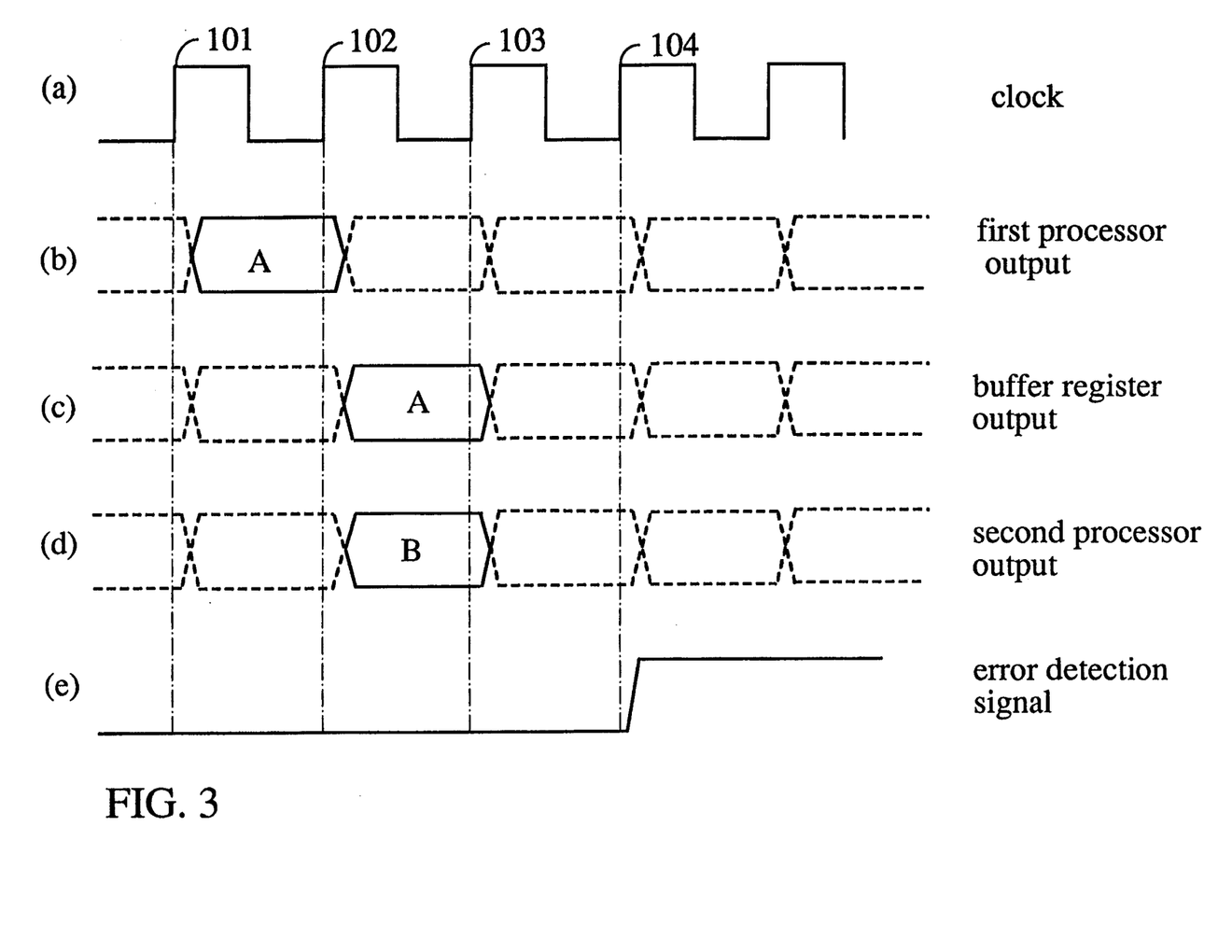
FIG. 3 is a timing chart of the information processing apparatus of a first embodiment.

The operation of the first processor 10a for writing the data into the memory 11 is described here using FIG. 2. FIG. 3 is a timing chart of the information processor in FIG. 2. At the rise point 101, the data from the first processor 10a is inputted into the comparator with buffer 31 by one bit before the second processor. At the rise point 102, the data received from the processor 10a is delayed by one clock period in the buffer register 62 and at the same time the data from the second processor 10b is inputted into the comparator with buffer 31. At the rise point 103, the data received from the first processor 10a and the second processor 10b are synchronized and inputted into the comparator 63 using the registers 58 and 59. At the rise point 103, each data is compared in the comparator 63 and the result is sent to the flip-flop 60. At the rise points 104, the compared result is sent from the buffer register 60 to the sub-processor 33. In FIG. 3, the output of the first processor 10a is indicated as "A" and the output of the second processor 10b is indicated as "B" and the error is detected at the rise point 104 of the clock signal.

The operation of the first processor which reads the data from the memory 11 is described here. When the first processor 10a reads out the data from the memory 11, the comparator with buffer 31 reads out the data at the same time. The data received from the first processor 10a is delayed by one clock period through the buffer register 62 and synchronized with the timing of the second processor 10b and sent to the second processor 10b through the driver 55. If the memory 11 operates as a cash memory, when the data is not in the memory 11, the previous data is written into the shared memory 2 through the buffer register 57, and the required data is read out from the shared memory 2. The read out data is sent to the first processor 10a via buffer register 56, and to the second processor 10b via the buffer registers 56 and 62. Therefore, the data of the second processor 10b is delayed by one clock period from the data of the first processor 10a.

The reason why the processor 10a operates delayed by one clock period from the processor 10a is described here.

In the conventional information processing apparatus shown in FIG. 8, the processor 10a and the processor 10b operate with the same phase condition. When the processor reads out the data from the memory 11a, the processor 10b delays by one clock period from the processor 10a since one clock period delay is added through the buffer 14a. Therefore the processor 10b must operate in consideration of the delay. The processor speed is becoming faster in these years. Some processors operate at the rate of over 50 MHz (20 ns/cycle). The delay time of the buffer 14a is about 5 ns. This delay time causes the processor 10b to delay reading out of the memory. Since the processor 10b must operate after the data has reached the processor 10b, operation at high frequency is prevented.

On the contrary, in the present invention, since the processor 10b operates after one clock period from the processor 10a, the processor 10b may receive the data from the memory after one clock period. Accordingly, the processors 10a and 10b can operate without considering the data delay.

In the above first embodiment, it is described that the second processor delays by one clock period from the first processor. When the operation frequency is higher and the corresponding delay is larger, the delay may be 2 clock periods or more by increasing register stages.

As described above, the first embodiment of the present invention comprises a first processor, a second processor which operates after one clock period from the first processor, a starting circuit which causes the second processor to start after the first processor, and a comparator which compares the outputs of the first processor and the second processor, and detects an error.

Second embodiment

Figure 4:
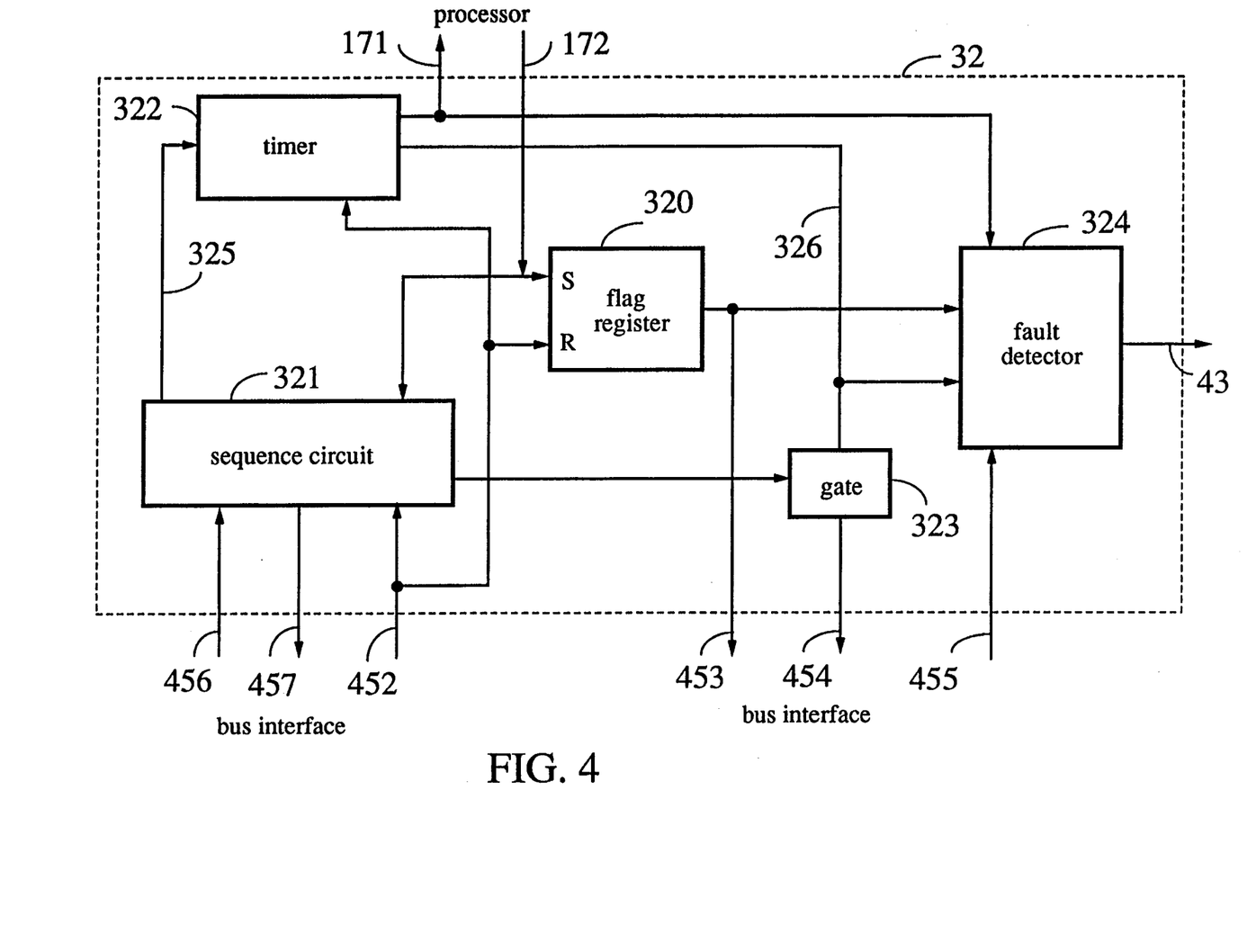
FIG. 4 is a block diagram of a second embodiment of the information processing apparatus of the present invention.

FIG. 4 is a block diagram of a second embodiments of the present invention.

In the figure, 32 is a hull monitor circuit of FIG. 1. 320 is a flag register for holding the state as to whether the processor is operating or not. 321 is a sequence circuit for controlling the operation sequence. 322 is a timer for measuring the elapsed time. 323 is a gate, 324 is a fault detector for detecting the fault. Signals 171 and 172 are connected with the processors 10a and 10b via the internal bus 17. Signals 452~457 are status signals 45 and connected with the bus interface 12.

Figure 5:
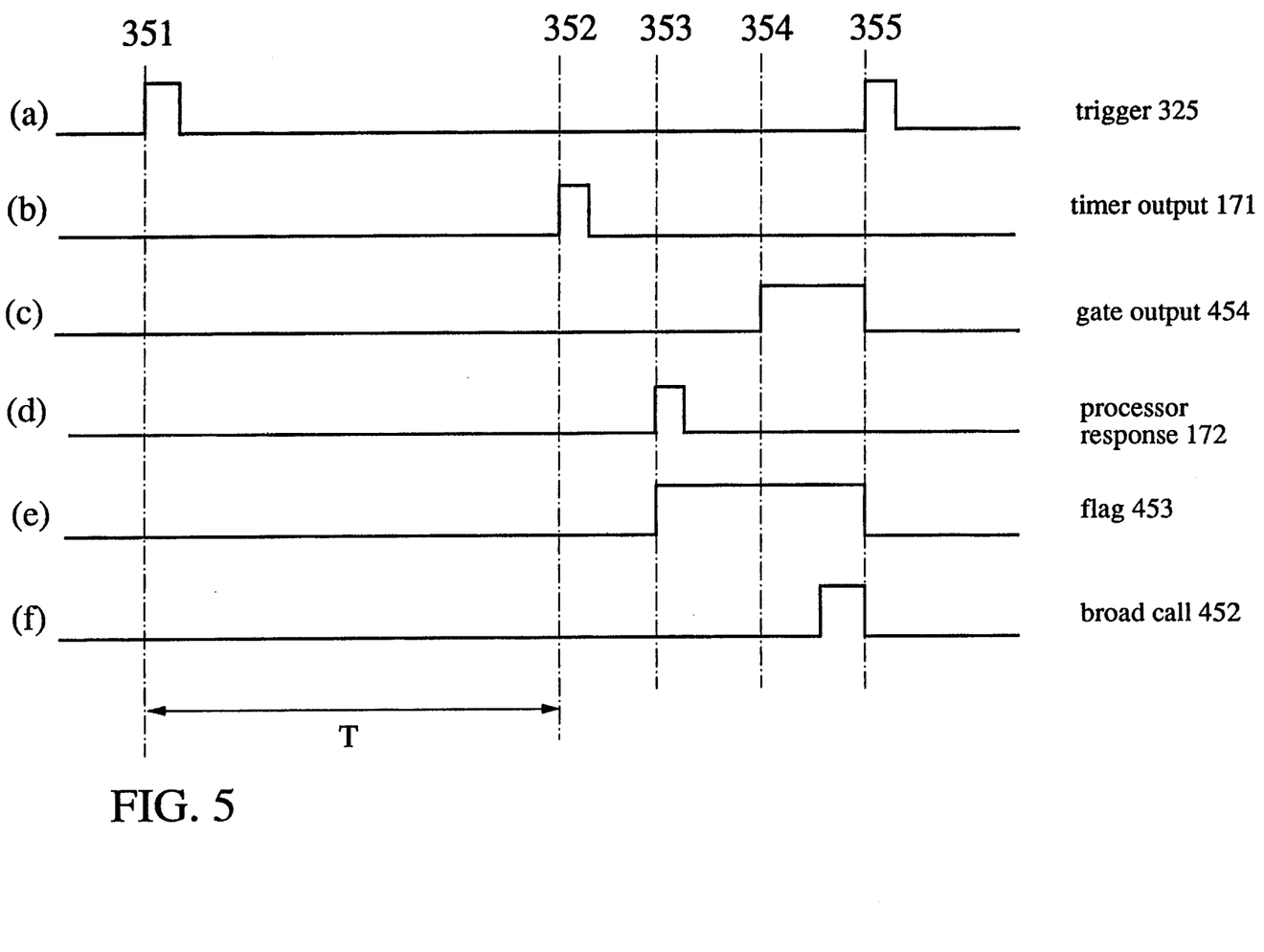
FIG. 5 is a timing chart which shows a normal operation in the second embodiment of the present invention.

The second embodiment of the present invention is described here. FIG. 5 is a timing chart which shows a normal operation. In the figure, (a) shows a waveform of the trigger 325, (b) shows a waveform of the timer output 171, (c) shows a waveform of the gate output 454, (d) shows a waveform of the response 172 from the processor, (e) shows a waveform of the output of the flag register 453, and (f) shows a waveform of the broad call input 452. The sequence circuit 321 of the first processor module outputs the trigger pulse 325 which shows the starting point of the sequence to the timer 322 ( see time 351 in the waveform (a)). After the period T has elapsed, the timer 322 generates the timer output 171 and sends it to the processor 10 via the internal bus 17 as interruption signal (see time 352 in the waveform (b)). The processor 10 receives the interruption signal, then outputs the signal 172 and sets the flag register 320 (see time 353 in the waveform (d), (e)). In case the second processor module has the right to read out flag information from all processor modules (called as broad call), the timer 322 of the second processor module generates the second output signal 326 after the period T. The signal 326 passes through the gate 323 by an enable signal from the sequence circuit 321 and requests a broad call to the bus interface 12. When the first processor module receives a broad call execution signal 452 via the bus interface 12, the sequence circuit 321 resets the flag register 320 and sends the trigger signal 325 to the timer 322 (see time 355 in the waveform (c), (e), (f)). As described above, the sequence circuit 321 generates a trigger signal 325 after the broad call is sent, and restart the timer 322 and synchronize both processors.

In the second embodiment of the present invention, when the second processor module sends the broad call, the first processor outputs the flag signal 453 from the flag register 320 to the system bus 4 in which the flag signal is allocated to the predetermined data bit. The data 455 is sent to the fault detector 324 in the detection circuit of the second processor module. When the fault detector 324 has received the data 455, the fault detector 324 judges that the fault has occurred in the first processor module corresponding to the flag which indicates non-operating state.

The operation of the second embodiment of the present invention is described in the case that the fault has occurred.

Figure 6:
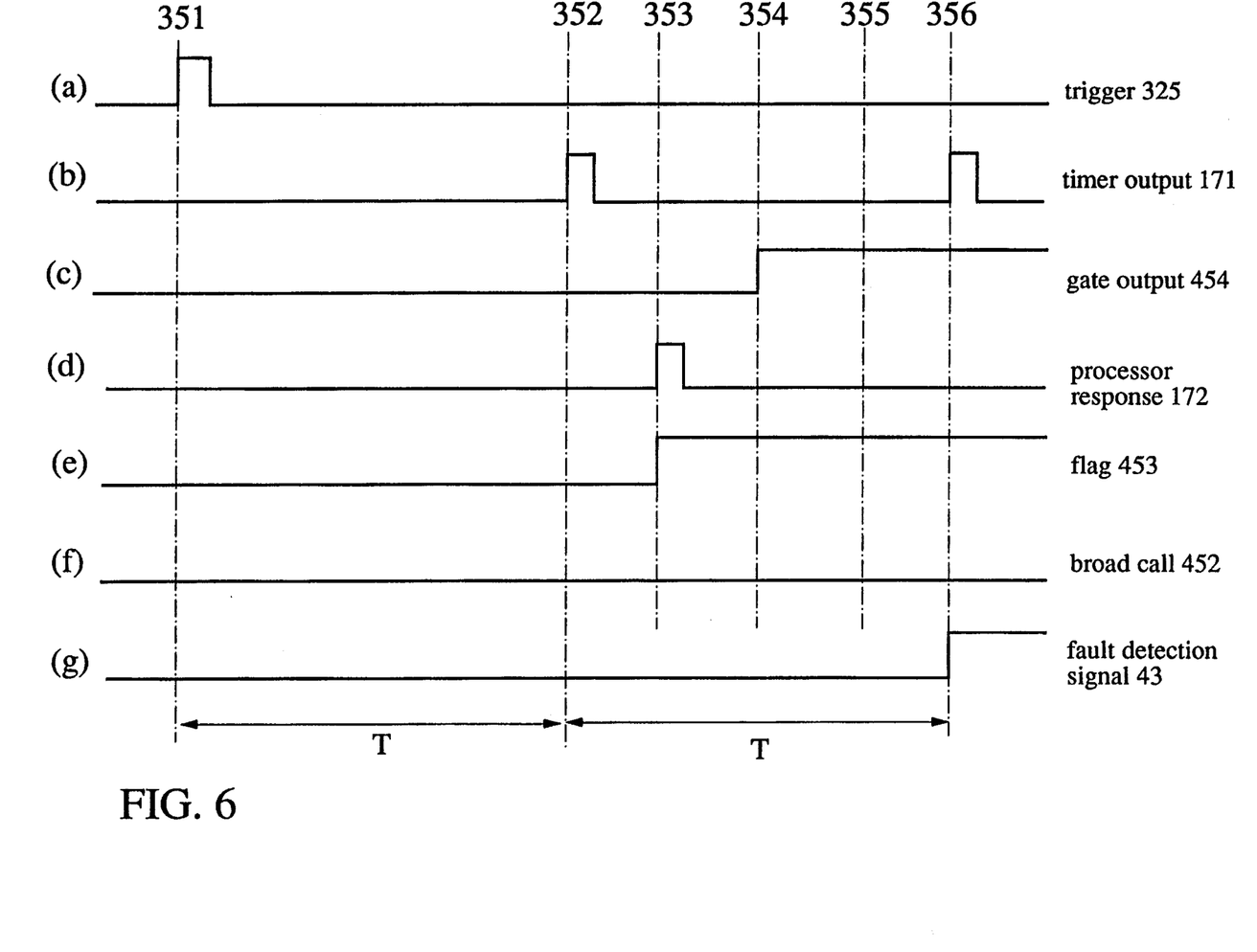
FIG. 6 is a timing chart for detecting a fault in the second embodiment of the present invention.

FIG. 6 is a timing chart of the first processor module when the fault has occurred in the second processor module having the right for the broad call. In the figure, the waveforms (a)~(f) and the operations until the time 354 are the same as those of FIG. 5, and thus the explanation is omitted. In the figure, (g) shows a waveform of the fault detection signal 43. At the time 356 after the time 355, namely in case that the timer 322 generates an output signal 171 after a period T from the time 352, the fault detector 324 detects the output signal 171 during the time the flag is in its operating state. In this case, the fault detector 324 judges that the reset function of the second processor module is not working and generates the fault detection signal 43.

The timer 322 of the second processor module generates the second output 326 and executes the broad call after a period T from the time 352. If the second processor module has the right of the broad call and the fault has occurred in the first processor module, the fault detector 324 in the second processor module checks the data 455 of the broad call. If the flag indicates a non-operation (reset) state, the fault detector 324 judges that a fault has occurred in the first processor module and generates a fault detection signal 43. In this case, since there is no processor output signal 172 corresponding to the output 171 from the timer 322, the flag register 320 can not be set, and thus the flag shows the non-operation (reset) state.

If a hull has occurred in the second processor module, as described above in the second embodiment, the fault detector 324 in the second processor module detects the reset state, namely the non-operation state, of the flag register 320 when the timer output 326 is generated, and outputs the fault detection signal 43.

The right change of the broad call is carried out by the sequence circuit 321 and bus interface 12. The sequence circuit 321 sends the right change request to the another processor module via signal 457, after having received the right change request from the signal 456 and having executed the broad call.

As described above, in the second embodiment having a plurality of processor modules of the present invention, the fault monitor circuits of the processor modules comprise a processor, a timer for measuring the elapsed time, a register holding the flag indicating the state of the operating processor, and a detector for detecting its own or another processor module's fault.

When the timer indicates the period T and the flag register 320 is trying to set the flag as an operation state, each fault monitor circuit of the processor modules judges that it has occurred a fault in the processor module having the right for reading the flag in all processor modules if the flag already indicates the operation state. When its own timer has read the flag from all processor modules after the period T, the fault monitor circuit of the processor module having the above right judges that a fault has occurred in the processor module in which the flag does not indicate the operation state.

Third Embodiment

In the above embodiments, the fault detector supplied in the processor modules is described. But it may be supplied in the I/O controller and other modules.

Fourth Embodiment

In the above embodiments, the fault detector supplied in the general information processing apparatus is described. But it may be applied to the controller such as the industrial plant, or the information processing apparatus such as the communication apparatus.

The present invention comprised of as described above, has the following effects.

According to the first embodiment of the present invention, the first processor immediately begins to carry out the next operation after sending its output to the comparator. Then the error is detected when the output of the second processor is inputted to the comparator. Accordingly, since the first processor need not wait the period required for the error detection, it is possible to increase the operation frequency.

According to the second embodiment, the fault monitor circuit is dispersed in each processor module. Since the monitor circuit need not be provided in the center of the system, the fault can be monitored with fewer bus traffic.

What is claimed is:

1. A multi-processor system with fault detection, comprising:
   a monitor circuit including a register with a flag;
   a first processor module including a processor and means for setting the flag at predetermined time intervals; and
   a second processor module including a processor and means for resetting the flag at predetermined time intervals which are offset from said time intervals of said first processor module;
   wherein the monitor circuit further includes means for detecting a non-reset condition of the flag indicative of a fault in the second processor module.

2. A multi-processor system with fault detection, comprising:
   a first processor module including a register with a flag and means for setting the flag at predetermined time intervals; a second processor module including means for resetting the flag; and a monitor circuit for reading a status of the flag at predetermined time intervals offset from said predetermined time intervals of said first processor module and for detecting a non-set status of the flag indicative of a fault in the first processor module.

3. A multi-processor system with fault detection, comprising:

a data bus;

a first processor module, connected to the data bus;

a second processor module, connected to the data bus;

wherein the first processor module further includes a first monitor circuit including a register with a flag, the first monitor circuit further including means for setting the flag after a predetermined period;

wherein the second processor module further includes a second monitor circuit including means for outputting a signal to the first processor module via the data bus to reset the flag; and wherein the first monitor circuit further includes means for detecting a non-reset status of the flag indicative of a fault in the second processor.

4. A multi-processor system with fault detection, comprising:

a data bus;

a first processor module, connected to the data bus;

a second processor module, connected to the data bus;

wherein the first processor module further includes a register with a flag, means for setting the flag after a first predetermined period, and means for outputting a flag signal containing the status of the flag to the data bus; and wherein the second processor module further includes a monitor circuit including means for accepting the flag signal from the data bus and for reading the status of the flag after a second predetermined period longer than the first predetermined period, and for detecting a non-set status of the flag indicative of a fault in the first processor module.

5. A method for detecting a fault and associating the fault with a processor module in a multi-processor system, the multi-processor system having at least two processor modules, each processor module having a first processor, a second processor and a register with a flag, comprising the steps of:

starting the first processor of each processor module;

starting the second processor of each processor module at least one clock period later than the first processor of the same processor module;

setting the flag of a first processor module to a first condition indicative of operation of the first processor module;

resetting the flag of the first processor module to a second condition indicative of operation of a second processor module;

detecting the condition of the flag of the first processor module to determine a fault; and associating the fault with one of the first and second processor modules according to the detected condition.

6. A method for detecting a fault according to claim 5, further including the step of:

comparing an output of the first processor of each processor module with an output of the respective second processor of each processor module to detect a fault.

7. A method for detecting a fault according to claim 6, further including the steps of:

associating a fault with the second processor module when the flag of the first processor module is detected in the first condition; and associating a fault with the first processor module when the flag of the first processor module is detected in the second condition.

8. A method for detecting a fault according to claim 5, further including the steps of:

associating a fault with the second processor module when the flag of the first processor module is detected in the first condition; and associating a fault with the first processor module when the flag of the first processor module is detected in the second condition.

9. A method for detecting a fault and associating the fault with a processor module in a multi-processor system, the multi-processor system having at least two processor modules, each processor module having a first processor, a second processor and a register with a flag, comprising the steps of:

starting the first processor of each processor module;

starting the second processor of each processor module at least one clock period later than the first processor of the same processor module;

setting the flag of a first processor module to a first condition indicative of operation of of the first processor module;

resetting the flag of the first processor module to a second condition indicative of operation of a second processor module;

comparing an output of the first processor of each processor module with an output of the respective second processor of each processor module to detect a fault.

10. A method for detecting a fault according to claim 9, further including the steps of:

associating a fault with the second processor module when the flag of the first processor module is detected in the first condition; and associating a fault with the first processor module when the flag of the first processor module is detected in the second condition.

11. A processor module for a multi-processor system with fault detection, the multi-processor system including a plurality of processor modules connected to a data bus, said processor module comprising:

a starting circuit generating a first start signal and generating a second start signal delayed from said first start signal;

a memory for storing data connected to a first data path;

a bus interface connected to the data bus for transferring data between said data bus and said memory;

a first processor connected to said first data path, having an input means for accepting said first start signal, for processing data stored in said memory, and for outputting a first output on said first data path;

a second processor connected to a second data path having input means for accepting said second start signal so that operation of said second processor is delayed and overlapping in time with respect to the first processor, said second processor outputting a second output on said second data path which is delayed with respect to the first output;

a comparator having means connected to said first data path for receiving the first output from the first processor, and means connected to said second data path for receiving the second output from the second processor, said comparator comparing said first output and said second output and outputting an error signal on a third data path based upon detecting an error;

a fault monitor circuit connected to said bus interface for monitoring operation of another processor module and for outputting a fault signal on a fourth data path; and a sub-processor connected to said third data path and to said fourth data path, said sub-processor outputting a stop signal to said bus interface to inhibit further operation of said bus interface and outputting a module fault signal to another processor module, upon receipt of one of said error signal and said fault signal.

12. A processor module according to claim 11, wherein the comparator includes means for compensating for the time delay between data received from the first processor along the first data path and data received from the second processor along the second data path.

* * * * *